United States Patent
Meng et al.

(10) Patent No.: US 9,107,147 B1
(45) Date of Patent: Aug. 11, 2015

(54) SYSTEMS AND METHODS FOR DYNAMICALLY MODIFYING RULES FOR SELECTING SUITABLE MOBILE NETWORKS

(75) Inventors: Qingchun Meng, Beijing (CN); Guilin Hu, Beijing (CN); Yanjiao Zuo, Chengdu Sichuan (CN); Xue Feng Tian, Beijing (CN)

(73) Assignee: Symantec Corporation, Mountain View, CA (US)

( * ) Notice: Subject to any disclaimer, the term of this patent is extended or adjusted under 35 U.S.C. 154(b) by 281 days.

(21) Appl. No.: 13/493,569

(22) Filed: Jun. 11, 2012

(51) Int. Cl.
*H04W 72/00* (2009.01)
*H04W 48/18* (2009.01)

(52) U.S. Cl.
CPC .................................... *H04W 48/18* (2013.01)

(58) Field of Classification Search
CPC ............................. H04W 48/00; H04W 48/18
USPC ............ 455/435.2, 3, 127.4, 422.1, 450–455, 455/464, 509, 432.1–434; 370/328–337, 370/339, 341–348, 431–463
See application file for complete search history.

(56) References Cited

U.S. PATENT DOCUMENTS

| | | | |
|---|---|---|---|
| 2005/0239497 A1* | 10/2005 | Bahl et al. | 455/552.1 |
| 2006/0146825 A1* | 7/2006 | Hofstaedter et al. | 370/392 |
| 2007/0178933 A1* | 8/2007 | Nelson | 455/550.1 |
| 2011/0142024 A1* | 6/2011 | Drennan | 370/338 |
| 2012/0166622 A1* | 6/2012 | Draznin et al. | 709/224 |

* cited by examiner

*Primary Examiner* — Ronald Eisner
(74) *Attorney, Agent, or Firm* — ALG Intellectual Property, LLC

(57) ABSTRACT

A computer-implemented method for dynamically modifying rules for selecting suitable mobile networks. The method may include (1) identifying a set of predefined rules for selecting suitable mobile networks with which to connect, (2) obtaining a training data set that includes data about at least one candidate mobile network, (3) using machine learning to dynamically adjust, based at least in part on the training data set, the set of predefined rules, and (4) connecting to a suitable mobile network identified by the dynamically adjusted set of predefined rules. Various other methods, systems, and computer-readable media are also disclosed.

20 Claims, 6 Drawing Sheets

SYSTEMS AND METHODS FOR DYNAMICALLY MODIFYING RULES FOR SELECTING SUITABLE MOBILE NETWORKS

BACKGROUND

In today's highly connected environment, users of mobile computing devices (such as smartphones, tablets, etc.) often have a choice among a number of mobile networks over which to connect to the digital world. For example, a typical mobile computing device may be capable of allowing a user to connect to various types of mobile networks, which may include cellular networks (e.g., 3G or 4G networks) and/or Wi-Fi networks. Additionally, at any given time and at any given location, a number of each of these mobile networks may be available to the user. For these reasons, users of mobile computing devices have begun looking for methods for selecting mobile networks.

One current method for selecting mobile networks may include allowing a user of a mobile computing device to define one or more static rules for selecting mobile networks. This method may allow a user to indicate the user's preference for certain mobile networks. For example, a user may define one or more rules that indicate a preference to connect to certain Wi-Fi networks while at home or work and/or a preference to connect to free mobile networks when possible.

Unfortunately, this and other methods for selecting mobile networks that use simple static rules may be unable to adapt to changes in the quality, reliability, and/or availability of mobile networks. For example, a user may have indicated a preference for a certain mobile network that over time has become unsuitable to the user based on a decrease in the quality, reliability, and/or availability of the mobile network, while at the same time, a new more suitable mobile network may have become available to the user. In this example, a method for selecting mobile networks that uses simple static rules may continue to select the unsuitable mobile network over the more suitable mobile network. Accordingly, the instant disclosure addresses a need for additional and improved systems and methods for dynamically modifying rules for selecting suitable mobile networks.

SUMMARY

As will be described in greater detail below, the instant disclosure generally relates to systems and methods for using machine learning to dynamically modify rules for selecting suitable mobile networks. In one example, a computer-implemented method for dynamically modifying rules for selecting suitable mobile networks may include (1) identifying a set of predefined rules for selecting suitable mobile networks with which to connect, (2) obtaining a training data set that includes data about at least one candidate mobile network, (3) using machine learning to dynamically adjust, based at least in part on the training data set, the set of predefined rules, and then (4) connecting to a suitable mobile network identified by the dynamically adjusted set of predefined rules.

In at least one embodiment, the step of obtaining the training data set may include (1) requesting information about the candidate mobile network from a user and (2) receiving, in response to the request, the information about the candidate mobile network from the user. In some embodiments, the information about the candidate mobile network may include a preference of the user for the candidate mobile network, knowledge of the user of at least one characteristic of the candidate mobile network, and/or feedback of the user about the candidate mobile network. In certain embodiments, the request for information about the candidate mobile network may occur after the user has used the candidate mobile network for a predetermined amount of time.

In other embodiments, the step of obtaining the training data set may include (1) analyzing at least one characteristic of the candidate mobile network and (2) recording a value of the characteristic to the training data set. In at least one embodiment, the characteristic of the candidate mobile network may include a quality characteristic, a reliability characteristic, an upload-speed characteristic, a download-speed characteristic, a security characteristic, and/or a cost characteristic.

In various embodiments, the step of using machine learning to dynamically adjust the set of predefined rules may include (1) determining at least one additional rule for selecting suitable mobile networks with which to connect and (2) adding the additional rule to the set of predefined rules. In one embodiment, the set of predefined rules may include a user-defined rule for selecting suitable mobile networks with which to connect.

In one embodiment, a system for implementing the above-described method may include (1) an identification module programmed to identify a set of predefined rules for selecting suitable mobile networks with which to connect, (2) a training-data module programmed to obtain a training data set that includes data about one or more candidate mobile networks, (3) a training module programmed to use machine learning to dynamically adjust, based at least in part on the training data set, the set of predefined rules, (4) a connection module programmed to connect to a suitable mobile network identified by the dynamically adjusted set of predefined rules, and (5) at least one processor configured to execute the identification module, the training-data module, the training module, and the connection module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a set of predefined rules for selecting suitable mobile networks with which to connect, (2) obtain a training data set that includes data about one or more candidate mobile networks, (3) use machine learning to dynamically adjust, based at least in part on the training data set, the set of predefined rules, and (4) connect to a suitable mobile network identified by the dynamically adjusted set of predefined rules.

As will be explained in greater detail below, by using machine learning to dynamically modify rules for selecting suitable mobile networks, the systems and methods described herein may select suitable mobile networks with which to connect in a way that automatically adapts to changes to the quality, reliability, and/or availability of mobile networks and/or user preferences for mobile networks. Moreover, by analyzing user feedback and candidate mobile network characteristics, these systems and methods may identify and connect to mobile networks that are most suitable to users of mobile computing devices.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
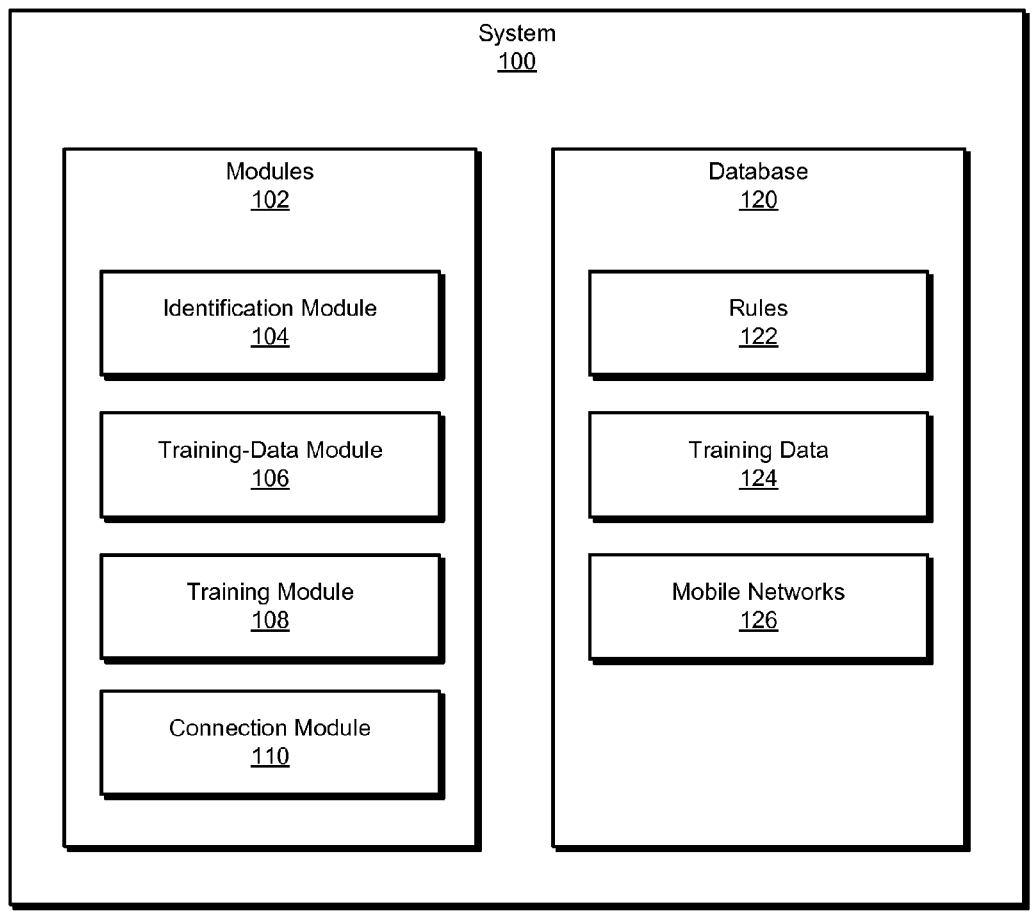
FIG. 1 is a block diagram of an exemplary system for dynamically modifying rules for selecting suitable mobile networks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
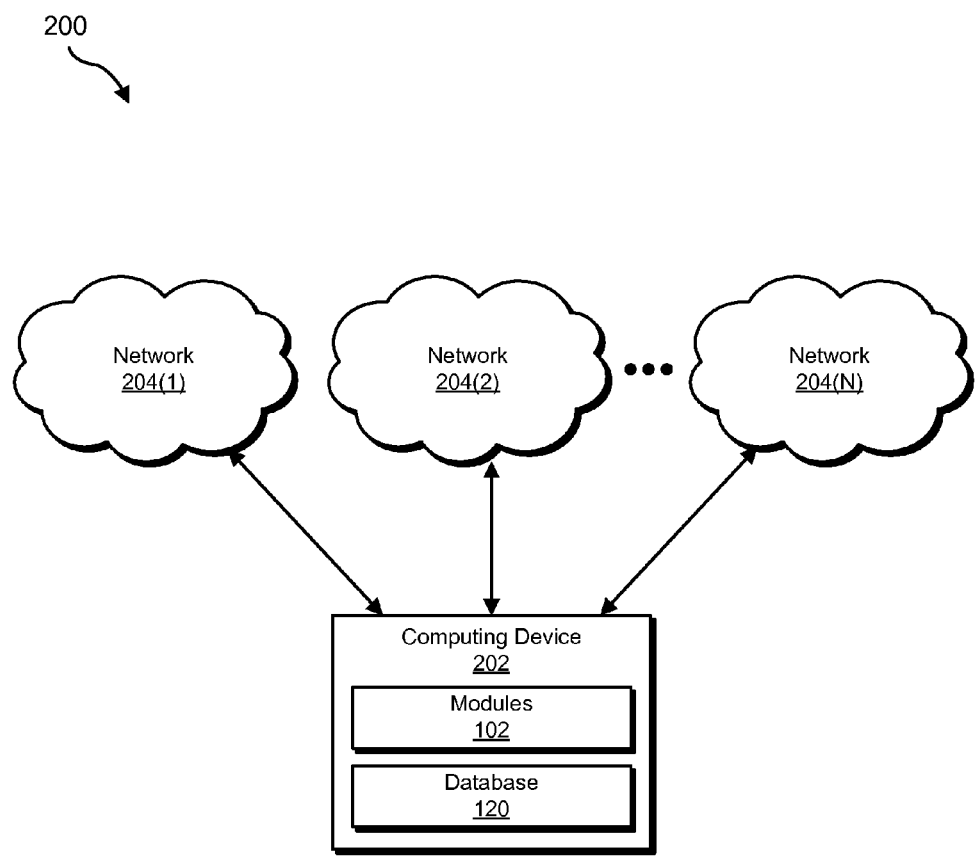
FIG. 2 is a block diagram of an exemplary system for dynamically modifying rules for selecting suitable mobile networks.

The following will provide, with reference to FIGS. 1-2, detailed descriptions of exemplary systems for dynamically modifying rules for selecting suitable mobile networks. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for dynamically modifying rules for selecting suitable mobile networks. As illustrated in this figure, exemplary system 100 may include one or more modules 102 for performing one or more tasks. For example, and as will be explained in greater detail below, exemplary system 100 may include an identification module 104 programmed to identify a set of predefined rules for selecting suitable mobile networks with which to connect. Exemplary system 100 may also include a training-data module 106 programmed to obtain a training data set that includes data about one or more candidate mobile networks.

In addition, and as will be described in greater detail below, exemplary system 100 may include a training module 108 programmed to use machine learning to dynamically adjust, based at least in part on a training data set, a set of predefined rules. Exemplary system 100 may also include a connection module 110 programmed to connect to a suitable mobile network identified by the dynamically adjusted set of predefined rules. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks. In at least one example, one or more of modules 102 in FIG. 1 may represent a software application for selecting mobile networks with which to connect running on a mobile computing device (e.g., a smartphone, a tablet, and/or a laptop).

As illustrated in FIG. 1, exemplary system 100 may also include one or more databases, such as database 120. For example, and as will be explained in greater detail below, database 120 may include rules 122 for storing rules for selecting suitable mobile networks with which to connect (e.g., set of rules 412 in FIG. 4). Database 120 may also include training data 124 for storing data used in machine learning to dynamically adjust rules for selecting suitable mobile networks (e.g., training data set 410 in FIG. 4). Furthermore, database 120 may include mobile networks 126 for storing data about one or more candidate mobile networks (e.g., mobile network metrics 402 and 414 in FIG. 4).

Database 120 may represent portions of a single database or computing device or a plurality of databases or computing devices. For example, database 120 may represent a portion of computing device 202 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing device 202 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 capable of communicating with at least one additional computing device via a network (e.g., one or more of networks 204(1)-(N)).

In one embodiment, one or more of modules 102 from FIG. 1 may, when executed by at least one processor of computing device 202, enable computing device 202 to dynamically modify rules for selecting suitable mobile networks. For example, and as will be described in greater detail below, one or more of modules 102 may cause computing device 202 to (1) identify a set of predefined rules (e.g., rules 122) for selecting suitable mobile networks with which to connect, (2) obtain a training data set (e.g., training data 124) that includes data about one or more candidate mobile networks (e.g., data about one or more of networks 204(1)-(N)), (3) use machine learning to dynamically adjust, based at least in part on the training data set, the set of predefined rules, and (4) connect to a suitable mobile network (e.g., one of networks 204(1)-(N)) identified by the dynamically adjusted set of predefined rules.

Computing device 202 generally represents any type or form of computing device capable of reading computer-executable instructions and connecting to a mobile network. Examples of computing device 202 include, without limitation, laptops, tablets, desktops, servers, smartphones, cellular phones, personal digital assistants (PDAs), multimedia players, embedded systems, combinations of one or more of the same, exemplary computing system 510 in FIG. 5, or any other suitable computing device.

Networks 204(1)-(N) generally represent any medium or architecture capable of facilitating communication or data transfer. Examples of networks 204(1)-(N) include, without limitation, an intranet, a wide area network (WAN), a local area network (LAN), a personal area network (PAN), the Internet, power line communications (PLC), a cellular network (e.g., a GSM Network, a 3G Network, or a 4G Network), exemplary network architecture 600 in FIG. 6, or the like. Networks 204(1)-(N) may facilitate communication or data transfer using wireless (e.g., Wi-Fi) or wired connections. In one embodiment, networks 204(1)-(N) may facilitate communication between computing device 202 and at least one additional computing device.

Figure 3:
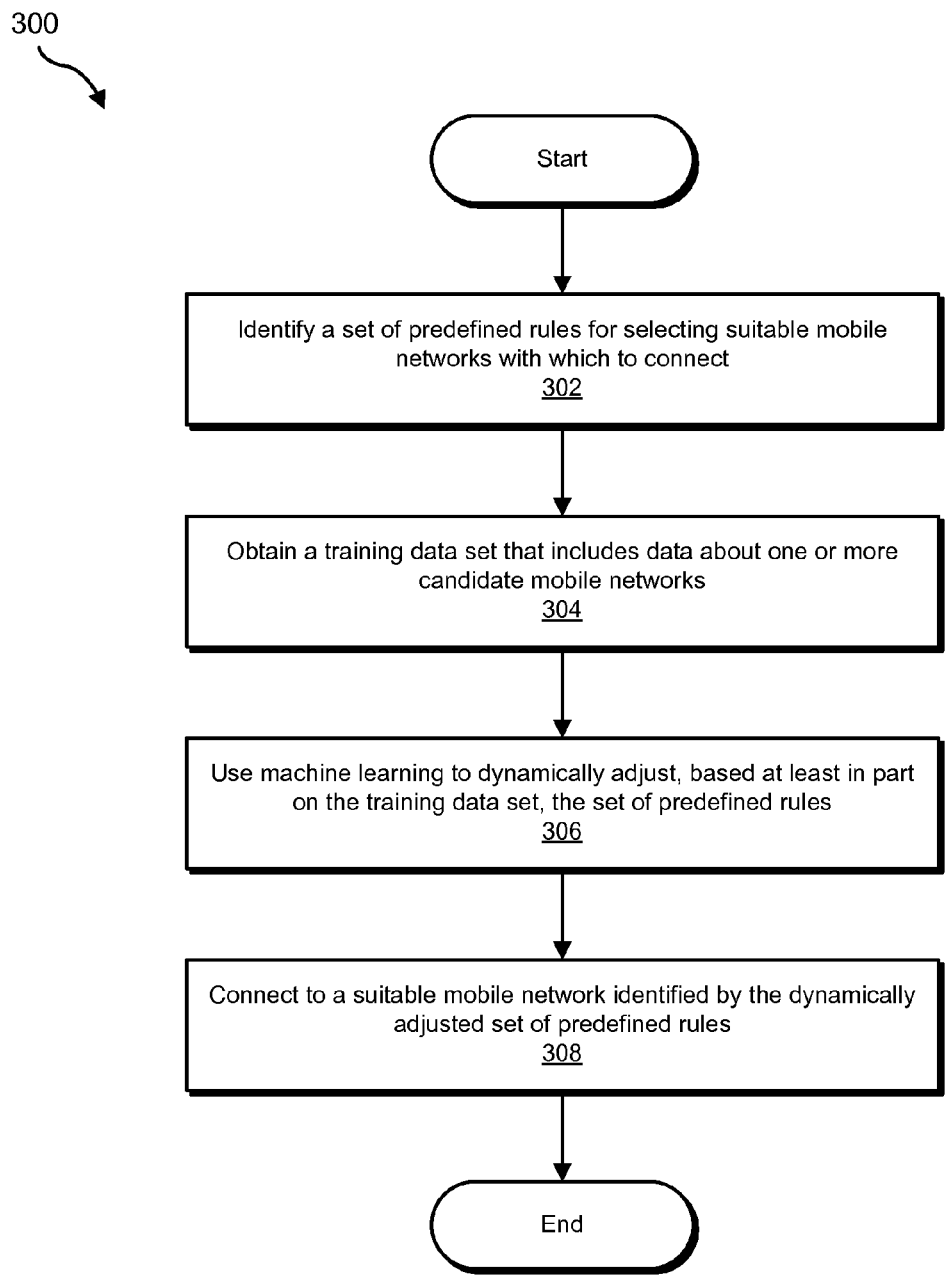
FIG. 3 is a flow diagram of an exemplary method for dynamically modifying rules for selecting suitable mobile networks.

FIG. 3 is a flow diagram of an exemplary computer-implemented method 300 for dynamically modifying rules for selecting suitable mobile networks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

Figure 4:
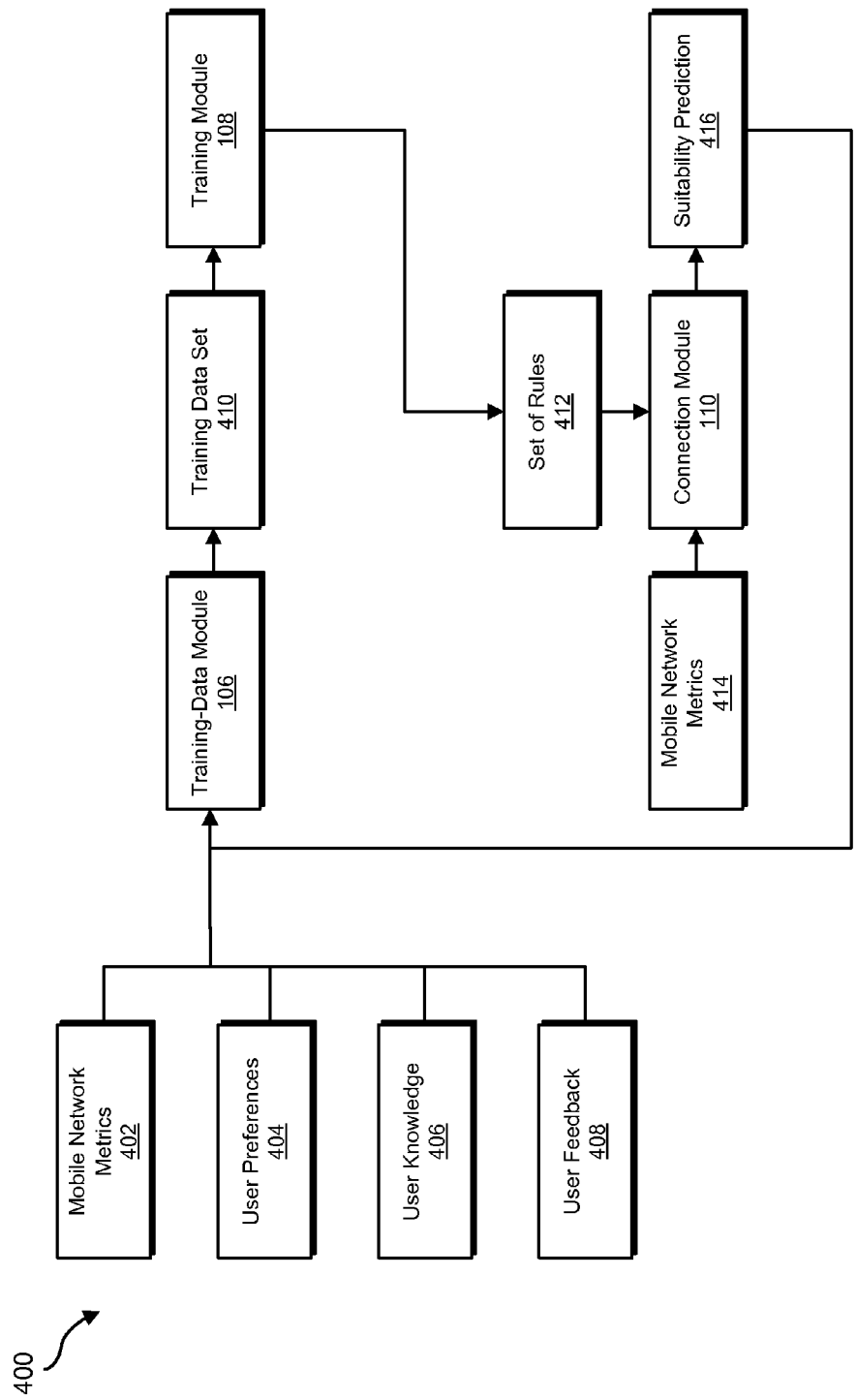
FIG. 4 is an illustration of an exemplary process flow for using machine learning to dynamically modify rules for selecting suitable mobile networks.

The steps shown in FIG. 3 may be implemented in a variety of ways. One such implementation is provided in FIG. 4. FIG. 4 is an illustration of an exemplary process flow 400 for using machine learning to dynamically modify rules for selecting suitable mobile networks. Exemplary process flow 400 will be used as an example throughout the following discussion of FIG. 3.

At step 302, one or more of the systems described herein may identify a set of predefined rules for selecting suitable mobile networks with which to connect. For example, at step 302, identification module 104 may, as part of computing device 202 in FIG. 2, identify one or more of rules 122 for selecting suitable mobile networks with which to connect.

As used herein, the term "rule" may refer to any method for selecting a mobile network with which a user would prefer to connect from among one or more candidate mobile networks and/or any method for predicting whether a mobile network would be suitable to a user. In one example, a rule or set of rules may include an algorithm (e.g., a machine-learning based algorithm) for determining a suitability of a candidate mobile network. For example, a rule or set of rules may use information known about candidate mobile networks (e.g., user preferences or network characteristics) to classify the candidate mobile networks into one or more categories (e.g., bad, common, or good, suitable or unsuitable, etc.). In another example, a rule or set of rules may use information known about candidate mobile networks to rank candidate mobile networks by their suitability.

Additionally and/or alternatively, a rule may define a user's preference for a specific mobile network, a set of characteristics that identifies a suitable mobile network, and/or the circumstances (e.g., a time or place) wherein a mobile network would be preferred or suitable. For example, a rule may describe a user's preferences for a specific mobile network while the user is at home (e.g., a personal Wi-Fi network of the user), another specific mobile network while the user is at work (e.g., a Wi-Fi network of the user's employer), and/or a preferred type of mobile network while the user travels between the user's home and work (e.g., a Wi-Fi network that is free to use).

The term "suitable mobile network," as used herein, may refer to any mobile network accessible to a mobile computing device and that is preferred by and/or is suitable to a user of the mobile computing device. As will be explained in greater detail below, a "suitable mobile network" may also refer to a mobile network with the best or most suitable characteristics (e.g., quality, reliability, and/or security characteristics) as identified by a set of rules for selecting suitable mobile networks.

Returning to FIG. 3, the systems described herein may identify a set of predefined rules for selecting suitable mobile networks with which to connect in any suitable manner. In one example, identification module 104 may receive at least one rule for selecting suitable mobile networks from a user. For example, identification module 104 may allow a user of computing device 202 specify one or more of mobile networks 204(1)-(N) with which the user would prefer to connect. For example, identification module 104 may display to the user of computing device 202 a list of mobile networks and may allow the user to rank or otherwise indicate the user's preference for at least one mobile network within the list of mobile networks.

In another example, identification module 104 may allow a user to specify one or more preferred characteristics (e.g., a type of network, a download speed, a security level, etc.) of suitable mobile networks. For example, identification module 104 may display to the user of computing device 202 a list of characteristics of mobile networks and may allow the user to rank or otherwise indicate the user's preference for at least one characteristic within the list of characteristics. For example, identification module 104 may display to the user of computing device 202 a list of categories of mobile networks (such as Wi-Fi network, 3G network, etc.) and may allow the user to rank or otherwise indicate the user's preference for each category. Identification module 104 may also allow the user to define a circumstance wherein each category is preferred (e.g., at home, at work, or when commuting to or from work).

In at least one example, identification module 104 may identify the set of predefined rules for selecting suitable mobile networks with which to connect using a suitable machine learning method. For example, identification module 104 may identify set of rules 412 in FIG. 4 (e.g., a set of rules determined in a manner similar to that described below in steps 304 and 306).

As will be explained in greater detail below, the set of predefined rules for selecting suitable mobile networks may allow the systems and methods described herein to identify (e.g., using machine learning methods) characteristics of suitable mobile networks.

Returning to FIG. 3, at step 304, one or more of the systems described herein may obtain a training data set that includes data about one or more candidate mobile networks. For example, at step 304, training-data module 106 may, as part of computing device 202 in FIG. 2, obtain a training data set that includes data about networks 204(1)-(N) from training data 124.

As used herein, the term "training data set" may refer to a set of training data about one or more candidate mobile networks that may be used as input to a machine-learning training algorithm (e.g., a supervised, unsupervised, semi-supervised training algorithm) capable of adjusting a set of predefined rules for selecting mobile networks with which to connect. For example, and as will be described in greater detail below, training data may include mobile network characteristics (e.g., mobile network metrics, rankings, classifications, etc.), user preferences, user knowledge, and/or user feedback.

In addition, the term "candidate mobile network," as used herein, may refer to any mobile network with which a mobile computing device may connect and/or any mobile network to which a user of the mobile computing device has access. Examples of candidate mobile networks may include, without limitation, mobile networks that are free to use (e.g., a free Wi-Fi hotspot), mobile networks that do not require authentication, and/or mobile networks that do require authentication and that a user of a mobile computing device possesses the necessary authentication credentials to access. For example, candidate mobile networks of computing device 202 in FIG. 2 may include networks 204(1)-(N).

The systems described herein may obtain a training data set that includes data about one or more candidate mobile networks in any suitable manner. For example, as illustrated in FIG. 4, training-data module 106 may create training data set 410 by obtaining mobile network metrics (e.g., mobile network metrics 402), user preferences (e.g., user preferences 404), user knowledge (e.g., user knowledge 406), user feedback (e.g., user feedback 408), and/or a suitability prediction (e.g., suitability prediction 416).

As used herein, the term "user preference" may refer to any indication that a user prefers to connect to one mobile network over another or that the user prefers to not connect to a mobile network. In one example, training-data module 106 may, after connection module 110 identifies a candidate mobile network as a suitable mobile network, request and/or receive a preference of the user for the candidate mobile network by (1) displaying to the user the candidate mobile network and (2) allowing the user to indicate whether the user wishes to connect to the candidate mobile network. In this example, an action by the user to connect to the candidate mobile network may indicate that the user prefers the candidate mobile network and/or that the user prefers characteristics of the candidate mobile network.

As used herein, the term "user knowledge" may refer to any user-provided information about a mobile network characteristic. For example, a user may know of a security characteristic of a candidate mobile network (e.g., that the candidate mobile network tracks or steals personal information) or an availability characteristic of the candidate mobile network (e.g., that the candidate mobile network will be shut down or will be unavailable).

As used herein, the term "user feedback" may generally refer to feedback received from a user concerning the quality of an identified suitable mobile network. For example, a user may provide to training-data module 106 feedback that indicates that a suitable mobile network identified by connection module 110 as part of step 308 was correctly or incorrectly identified (e.g., correctly or incorrectly classified or ranked). Additionally, a user may provide to training-data module 106 feedback after the user has used the candidate mobile network for a predetermined amount of time. For example, a user may rate the user's experience with the candidate mobile network (e.g., using a term such as "good", "common", or "bad"). In addition, the user may rate at least one characteristic of the candidate mobile network. For example, the user may rate the download speed a candidate mobile network using a term such as "too slow".

Additionally and/or alternatively, training-data module 106 may obtain the training data set by measuring and recording at least one characteristic of the candidate mobile network. For example, training-data module 106 may obtain mobile network metrics 402 in FIG. 4 by analyzing the quality of the candidate mobile network (e.g., a number of dropped packets experienced over the candidate mobile network), the reliability of the candidate mobile network (e.g., whether or how often the candidate mobile network breaks down), how fast data can be uploaded and/or downloaded via the candidate mobile network (e.g., an upload speed, a download speed, or network latency), whether the candidate mobile network is secure (e.g., whether the candidate mobile network uses an encryption technology), and/or any cost to use the candidate mobile network.

In one example, in addition to analyzing and recording at least one characteristic of the candidate mobile network, training-data module 106 may also compare and/or rank the characteristic of the candidate mobile network with that of other candidate mobile networks and may include within the training data set this comparison and/or rank with the other measured characteristics of the candidate mobile network.

In another example, in addition to analyzing and recording at least one characteristic of the candidate mobile network, training-data module 106 may also classify and or rank the characteristic of the candidate mobile network using the predefined set of rules for selecting suitable mobile networks identified in step 302 (e.g., set of rules 412 in FIG. 4) and may include within the training data set this classification and/or rank with the other measured characteristics of the candidate mobile network.

At step 306, one or more of the systems described herein may use machine learning to dynamically adjust, based at least in part on the training data set, the set of predefined rules. For example, at step 306, training module 108 may, as part of computing device 202 in FIG. 2, use machine learning to identify set of rules 412 in FIG. 4 based at least in part on an analysis of training data set 410 in FIG. 4.

The systems described herein may perform step 306 in any suitable manner. For example, training module 108 may dynamically adjust the set of predefined rules by using machine learning (e.g., a suitable supervised, unsupervised, and/or semi-supervised machine learning algorithm) to train, based on an analysis of training data set 410 in FIG. 4, set of rules 412 (e.g., a machine learning-based classifying or ranking algorithm)

In one example, training module 108 may use user-provided data (e.g., user preferences, user knowledge, and user feedback) and a suitable supervised machine learning algorithm to generate a machine learning-based classifying or ranking algorithm that is capable of distinguishing between suitable and unsuitable mobile networks. In this example, the machine learning-based classifying or ranking algorithm may represent the adjusted set of predefined rules.

Additionally and/or alternatively, training module 108 may use measured mobile network characteristics and a suitable unsupervised or semi-supervised machine learning algorithm to identify which characteristics of mobile networks are useful for distinguishing between suitable and unsuitable mobile networks. In one example, training module 108 may dynamically adjust the set of predefined rules by determining one additional rule for selecting suitable mobile networks using these identified characteristics.

Training module 108 may use machine learning to dynamically adjust the set of predefined rules at any suitable interval. In one example, training module 108 may continually adjust the set of predefined rules as new training data is obtained by training-data module 106. In another example, training module 108 may adjust the set of predefined rules at predefined intervals. For example, training module 108 may adjust the set of predefined rules every day, week, or month. Additionally and/or alternatively, training module 108 may adjust the set of predefined rules after training-data module 106 has collected a predefined amount of training data.

By continually modifying the set of rules for selecting mobile networks with which to connect, the systems and methods described herein may be able to select suitable mobile networks with which to connect in a way that automatically adapts to changes to the quality, reliability, and/or availability of mobile networks and/or user preferences for mobile networks.

At step 308, one or more of the systems described herein may connect to a suitable mobile network identified by the dynamically adjusted set of predefined rules. For example, at step 308, connection module 110 may, as part of computing device 202 in FIG. 2, connect computing device 202 to one of networks 202(1)-(N) identified as a suitable mobile network by set of rules 412 in FIG. 4.

The systems described herein may perform step 308 in any suitable manner. For example, connection module 110 may use set of rules 412 to predict a classification and/or rank (e.g., suitability prediction 416 in FIG. 4) for one or more available candidate mobile networks in order to identify which of the one or more available candidate mobile networks (e.g., any mobile network that computing device 202 may connect to) is a suitable mobile network and/or which is most suitable.

These one or more available candidate mobile networks may include a new or unknown mobile network (e.g., a mobile network that has not been previously classified and/or ranked) and/or an old or known mobile networks (e.g., a mobile network that has previously been classified as either suitable or unsuitable and/or ranked).

Prior to determining a suitability of a candidate mobile network, connection module 110 may determine any data (e.g., mobile network metrics 414) about the candidate mobile network that is required by the adjusted set of predefined rules (e.g., set of rules 412 in FIG. 4) to determine whether the candidate mobile network is suitable.

Connection module 110 may automatically connect to the identified suitable mobile network or may connect to the identify suitable mobile network in response to a request received from the user to connect to the suitable mobile network. For example, upon identifying one or more suitable mobile networks from among one or more available candidate networks, connection module 110 may display the one or more suitable mobile networks to the user and may allow the user to select from among the one or more suitable mobile networks a mobile network with which the user wishes to connect. Upon completion of step 308, exemplary method 300 in FIG. 3 may terminate.

As explained above, by using machine learning to dynamically modify rules for selecting suitable mobile networks, the systems and methods described herein may select suitable mobile networks with which to connect in a way that automatically adapts to changes to the quality, reliability, and/or availability of mobile networks and/or user preferences for mobile networks. Moreover, by analyzing user feedback and candidate mobile network characteristics, these systems and methods may automatically identify and connect to mobile networks that are most suitable to users of mobile computing devices.

Figure 5:
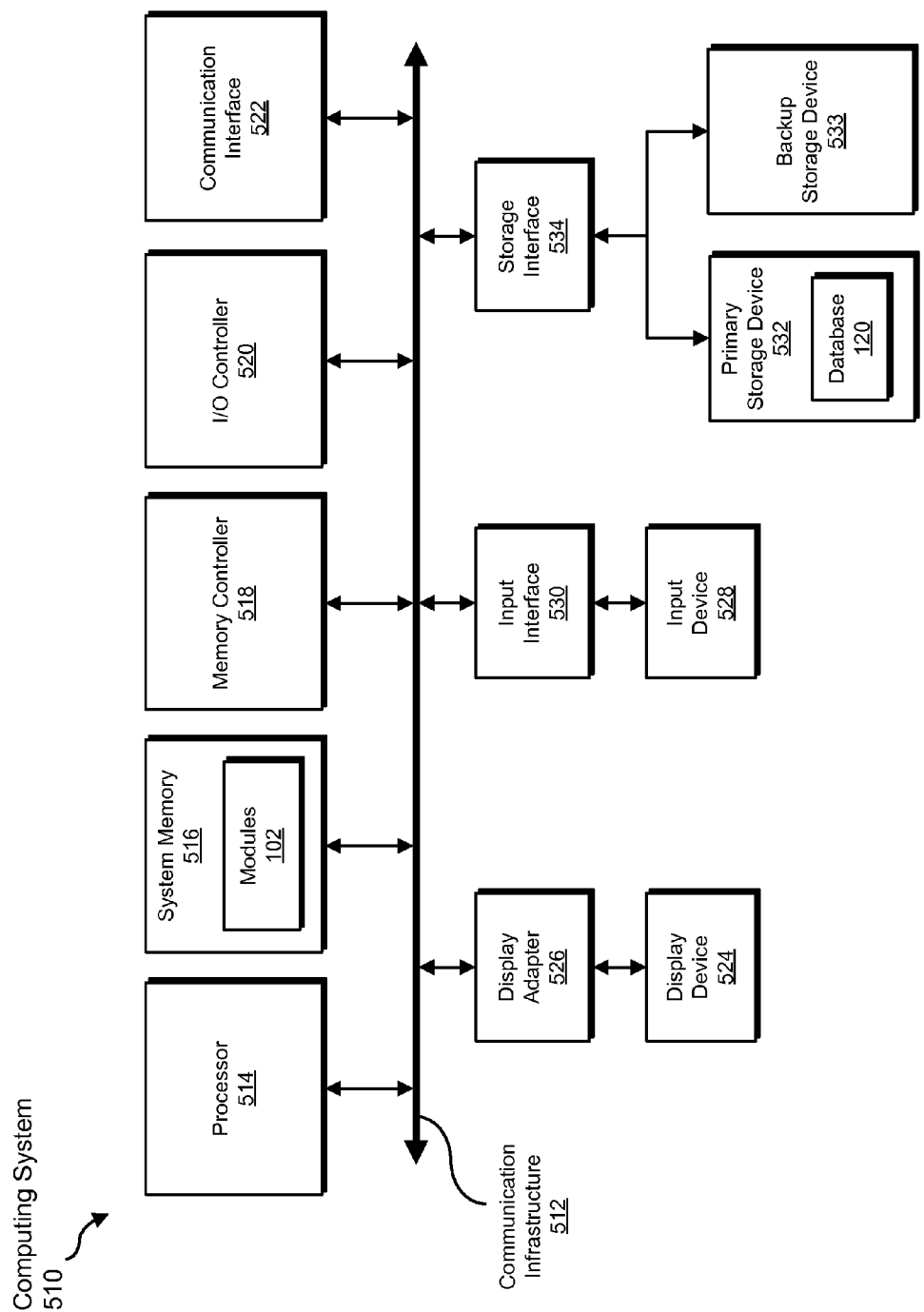
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the modifying, identifying, obtaining, using, connecting, requesting, receiving, analyzing, recording, determining, and adding steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
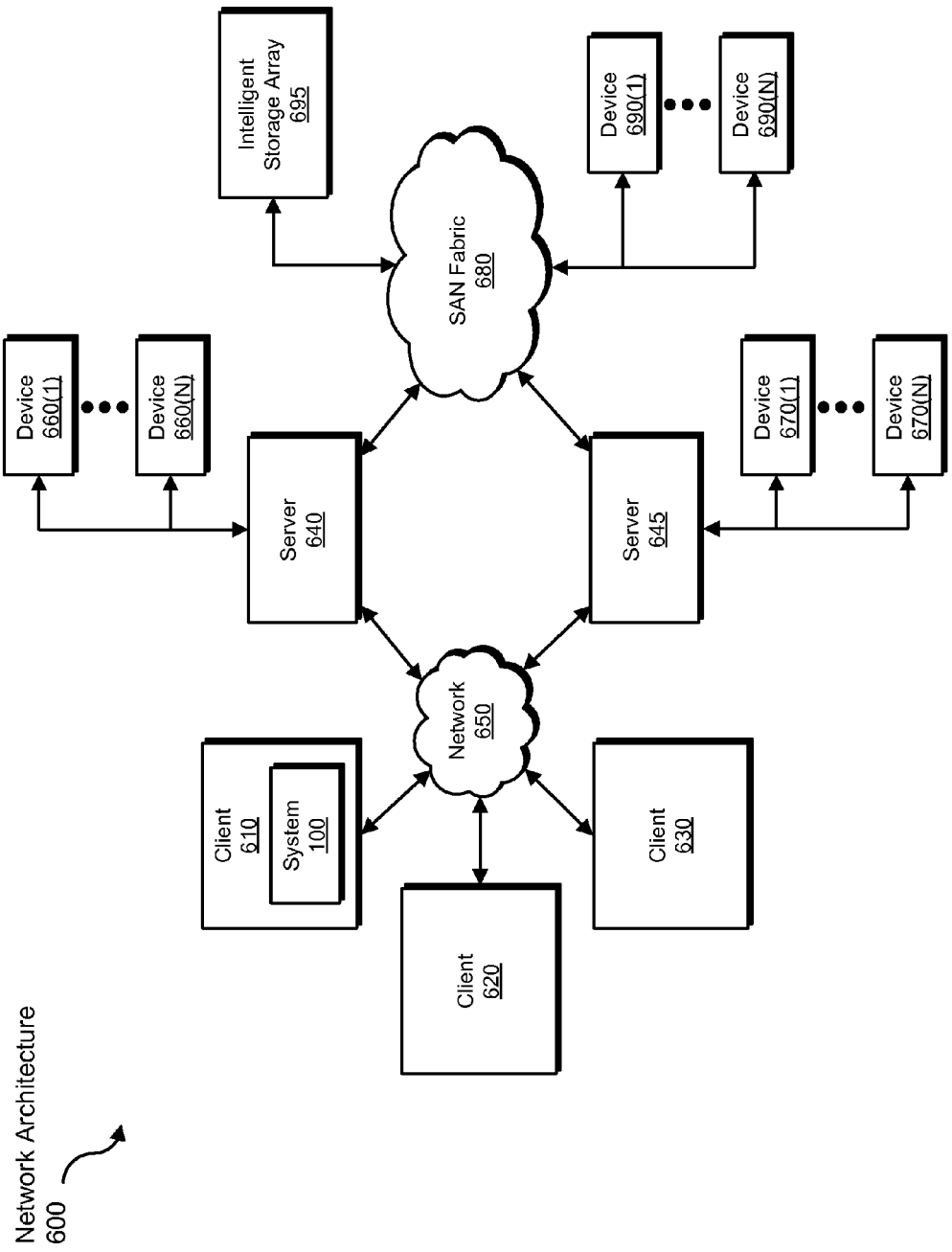
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the modifying, identifying, obtaining, using, connecting, requesting, receiving, analyzing, recording, determining, and adding steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for dynamically modifying rules for selecting suitable mobile networks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system capable of dynamically modifying rules for selecting suitable mobile networks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for dynamically modifying rules for selecting suitable mobile networks, at least a portion of the method being performed by a computing device comprising at least one processor, the method comprising:
- identifying a set of predefined rules for selecting suitable mobile networks with which to connect;
- receiving, after each rule in the set of predefined rules has been defined, user-provided data about at least one candidate mobile network;
- identifying, after each rule in the set of predefined rules has been defined, at least one characteristic of the candidate mobile network;
- predicting, after each rule in the set of predefined rules has been defined, a suitability of the candidate mobile network using the set of predefined rules;
- generating an additional rule for selecting suitable mobile networks using the user-provided data, the characteristic, and the suitability as input to a machine-learning training algorithm that outputs the additional rule;
- connecting to a suitable mobile network identified at least in part by the additional rule.

2. The computer-implemented method of claim 1, wherein receiving the user-provided data about the candidate mobile network comprises:
- requesting, after each rule in the set of predefined rules has been defined, the user-provided data about the candidate mobile network from a user of the computing device;
- receiving, in response to the request, the user-provided data about the candidate mobile network from the user.

3. The computer-implemented method of claim 2, wherein the user-provided data about the candidate mobile network comprises at least one of:
- a preference of the user for the candidate mobile network;
- knowledge of the user of at least one additional characteristic of the candidate mobile network;
- feedback of the user about the candidate mobile network.

4. The computer-implemented method of claim 2, wherein the request for the user-provided data about the candidate mobile network occurs after the user has used the candidate mobile network for a predetermined amount of time.

5. The computer-implemented method of claim 1, wherein identifying the characteristic of the candidate mobile network comprises:
- analyzing the characteristic of the candidate mobile network;
- recording a value of the characteristic to a training data set for use as input to the machine-learning training algorithm.

6. The computer-implemented method of claim 1, wherein the characteristic of the candidate mobile network comprises at least one of:
- a quality characteristic;
- a reliability characteristic;
- an upload-speed characteristic;
- a download-speed characteristic;
- a security characteristic;
- a cost characteristic.

7. The computer-implemented method of claim 1, wherein:
- generating the additional rule for selecting suitable mobile networks comprises dynamically adjusting the set of predefined rules by adding the additional rule to the set of predefined rules;
- the suitable mobile network is identified by the dynamically adjusted set of predefined rules.

8. The computer-implemented method of claim 1, wherein the suitability of the candidate mobile network comprises a rank of the candidate mobile network, the rank having been generated using the set of predefined rules.

9. A system for dynamically modifying rules for selecting suitable mobile networks, the system comprising:
- an identification module, stored in memory, that identifies a set of predefined rules for selecting suitable mobile networks with which to connect;
- a training-data module, stored in memory, that:
  - receives, after each rule in the set of predefined rules has been defined, user-provided data about at least one candidate mobile network;
  - identifies, after each rule in the set of predefined rules has been defined, at least one characteristic of the candidate mobile network;
  - predicts, after each rule in the set of predefined rules has been defined, a suitability of the candidate mobile network using the set of predefined rules;
- a training module, stored in memory, that generates an additional rule for selecting suitable mobile networks using the user-provided data, the characteristic, and the suitability as input to a machine-learning training algorithm that outputs the additional rule;
- a connection module, stored in memory, that connects to a suitable mobile network identified at least in part by the additional rule;
- at least one processor configured to execute the identification module, the training-data module, the training module, and the connection module.

10. The system of claim 9, wherein the training-data module is programmed to receive the user-provided data about the candidate mobile network by:
- requesting, after each rule in the set of predefined rules has been defined, the user-provided data about the candidate mobile network from a user of the system;
- receiving, in response to the request, the user-provided data about the candidate mobile network from the user.

11. The system of claim 10, wherein the user-provided data about the candidate mobile network comprises at least one of:
- a preference of the user for the candidate mobile network;
- knowledge of the user of at least one additional characteristic of the candidate mobile network;
- feedback of the user about the candidate mobile network.

12. The system of claim 10, wherein the training-data module is programmed to request the user-provided data about the candidate mobile network after the user has used the candidate mobile network for a predetermined amount of time.

13. The system of claim 9, wherein the training-data module is programmed to identify the characteristic of the candidate mobile network by:
- analyzing the characteristic of the candidate mobile network;
- recording a value of the characteristic to a training data set for use as input to the machine-learning training algorithm.

14. The system of claim 9, wherein the characteristic of the candidate mobile network comprises at least one of:
- a quality characteristic;
- a reliability characteristic;
- an upload-speed characteristic;
- a download-speed characteristic;
- a security characteristic;
- a cost characteristic.

15. The system of claim 9, wherein:
- the training module is programmed to generate the additional rule for selecting suitable mobile network by dynamically adjusting the set of predefined rules by adding the additional rule to the set of predefined rules;
- the connection module is programmed to identify the suitable mobile network using the dynamically adjusted set of predefined rules.

16. The system of claim 9, wherein the set of predefined rules comprises at least one user-defined rule for selecting suitable mobile networks with which to connect.

17. A non-transitory computer-readable-storage medium comprising one or more computer-executable instructions that, when executed by at least one processor of a computing device, cause the computing device to:
- identify a set of predefined rules for selecting suitable mobile networks with which to connect;
- receive, after each rule in the set of predefined rules has been defined, user-provided data about at least one candidate mobile network;
- identify, after each rule in the set of predefined rules has been defined, at least one characteristic of the candidate mobile network;
- predict, after each rule in the set of predefined rules has been defined, a suitability of the candidate mobile network using the set of predefined rules;
- generate an additional rule for selecting suitable mobile networks using the user-provided data, the characteristic, and the suitability as input to a machine-learning training algorithm that outputs the additional rule;
- connect to a suitable mobile network identified at least in part by the additional rule.

18. The non-transitory computer-readable-storage medium of claim 17, wherein the one or more computer-executable instructions are programmed to cause the computing device to receive the user-provided data about the candidate mobile network by:
- requesting, after each rule in the set of predefined rules has been defined, the user-provided data about the candidate mobile network from a user of the computing device;
- receiving, in response to the request, the user-provided data about the candidate mobile network from the user.

19. The non-transitory computer-readable-storage medium of claim 17, wherein the one or more computer-executable instructions are programmed to cause the computing device to identify the characteristic of the candidate mobile network by:
- analyzing the characteristic of the candidate mobile network;
- recording a value of the characteristic to a training data set for use as input to the machine-learning training algorithm.

20. The non-transitory computer-readable-storage medium of claim 17, wherein the set of predefined rules comprises at least one user-defined rule for selecting suitable mobile networks with which to connect.

* * * * *

UNITED STATES PATENT AND TRADEMARK OFFICE
CERTIFICATE OF CORRECTION

| | | |
|---|---|---|
| PATENT NO. | : 9,107,147 B1 | Page 1 of 1 |
| APPLICATION NO. | : 13/493569 | |
| DATED | : August 11, 2015 | |
| INVENTOR(S) | : Meng et al. | |

It is certified that error appears in the above-identified patent and that said Letters Patent is hereby corrected as shown below:

In the claims

Claim 15, column 17, lines 10-11, should read:

the training module is programmed to generate the additional rule for selecting suitable mobile networks by Signed and Sealed this
Nineteenth Day of July, 2016

Michelle K. Lee
*Director of the United States Patent and Trademark Office*